Nov. 8, 1966  A. J. MUNN  3,284,672
ELECTRONIC PACKAGE WITH TERMINAL MEANS ALONG
THREE SIDES OF CHASSIS
Filed Dec. 24, 1964  7 Sheets-Sheet 1

INVENTOR
A. J. MUNN
BY
Walter M. Hill
ATTORNEY

A. J. MUNN 3,284,672

ELECTRONIC PACKAGE WITH TERMINAL MEANS ALONG THREE SIDES OF CHASSIS

Filed Dec. 24, 1964

United States Patent Office 3,284,672
Patented Nov. 8, 1966

3,284,672
ELECTRONIC PACKAGE WITH TERMINAL MEANS ALONG THREE SIDES OF CHASSIS
Alfred J. Munn, Lyndhurst, N.J., assignor to Bell Telephone Laboratories, Incorporated, New York, N.Y., a corporation of New York
Filed Dec. 24, 1964, Ser. No. 420,944
4 Claims. (Cl. 317—101)

This invention relates to high density electronic circuit packages and more particularly to an improvement in a three dimensional package having a plurality of plug-in units or chassis which may be readily removed to facilitate circuit changes or repair.

A variety of plug-in circuit packages have been known for several years as exemplified by United States Patents 2,864,977, granted December 16, 1958 to R. P. Witt et al.; 2,880,379, granted March 31, 1959 to H. F. Stoddart et al.; 2,885,603, granted May 5, 1959 to C. A. Rose; and 2,889,493, granted June 2, 1959 to R. K-F Scal et al. In all of the known prior art, including the above-illustrative patents, access to the plug-in chassis within the package is through a terminal strip or plug unit located along only one of the chassis edges or ends. This considerably limits the number of external connections which can be made. As circuit density is increased, however, it becomes more and more desirable to increase the number of possible interconnections between adjacent chassis in all directions and by as short a route as is possible. Even if it would be practical to increase the number of external connections at the one end shown in the above patents, the circuit paths to chassis adjacent other edges would be much longer than necessary or desired. Moreover, it would be impossible to provide as many connections on one end as would be needed in high density circuitry. It is, therefore, desirable that access be made available for interconnections from more than one edge or end of each chassis and that the connections between the access terminals of adjacent chassis should be readily disconnected for quick removal and replacement of the chassis to facilitate circuit changes and repair. Moreover, the interconnecting means must minimize the effect of electrical discontinuities which cause reflections and crosstalk.

It is an object of this invention to rapidly connect and disconnect a plurality of adjacent circuit chassis through rows of terminals arranged along at least two ends or sides of each chassis to permit ready removal of any one or more of them for circuit modification or repair.

Another object is to rapidly and simultaneously connect a circuit chassis to all adjacent ones whether positioned laterally or endwise and to rapidly disconnect them again to permit their ready removal.

A further object is to quickly change the circuit paths between adjacent chassis.

A still further object is to minimize or practically eliminate the effect of electrical discontinuities which introduce reflections and crosstalk.

The foregoing objects are achieved by this invention which comprises a rack containing a plurality of compartments to slidably receive circuit chassis. In addition to the conventional end connectors on the chassis, contact springs are also included along the chassis sides to connect with stationary terminals supported by the compartment walls. An actuating mechanism is included inside each chassis to deflect the springs and cause them to make electrical connection to the stationary terminals and also to disconnect them again to permit removal of the chassis without mechanical interference by or damage to the contact springs. The contact springs are arranged parallel and include both ground and signal springs in a manner approximating a strip line configuration, thereby maintaining a controlled impedance through the connecting means to reduce both crosstalk and impedance mismatch. The stationary terminals to which the contact springs connect are easily changed to provide any combination of interconnections with adjacent chassis or ground.

The invention may be better understood by reference to the accompanying drawings, in which.

Figure 1:
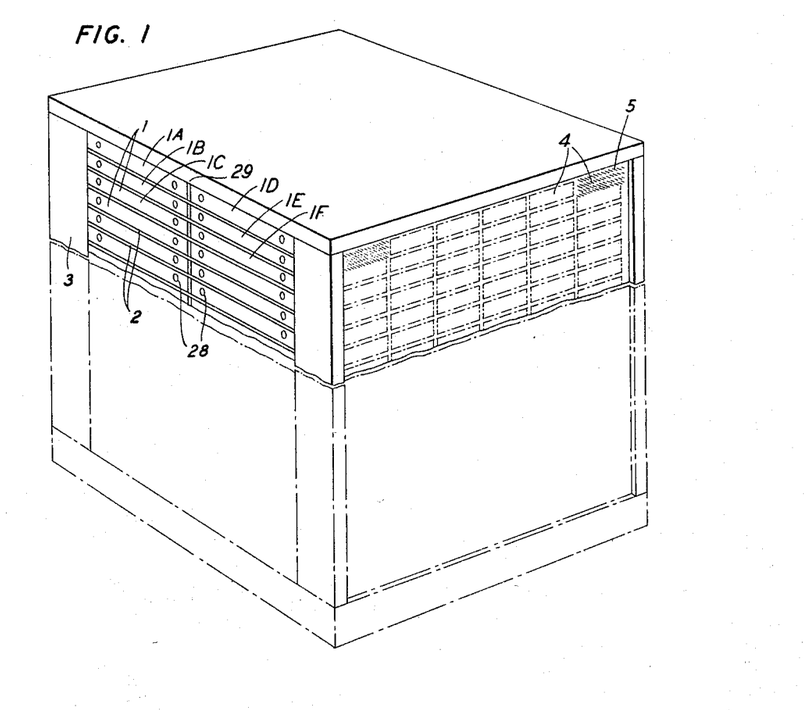
FIG. 1 illustrates the general configuration of a portion of a circuit package embodying the concepts of this invention.

The circuit package shown in FIG. 1 comprises a plurality of chassis 1 supported by chassis carrier plates 2 within a rack 3 having parallel sides permitting the chassis to be slidably inserted and withdraw from the rack. This figure also shows the side terminal field groups 4 with some of the terminal pins 5 shown extending from two of the terminal field groups. It will be noted from this figure that the side of each chassis is associated with six of the terminal field groups. As will become more apparent later, each of these terminal pins are associated with a removable module to facilitate adjustment, repair or replacement. The front of each of these circuit chassis contains a pair of holes 28 providing access for a screwdriver or wrench for operating the actuating mechanism for the contact springs to be subsequently described in greater detail. Test pin jacks, not shown, may be included on the front ends of the chassis.

Each of the terminal field groups 4 shown in FIG. 1 provides access to forty circuits in the chassis, the access being provided through contact springs which engage contact pads on the inner ends of the terminal field pins 5. Thus access for two hundred and forty circuits is provided on each side of each chassis. This access is an addition to those which are conventionally supplied at the inner ends of the chassis engaging complementary connection means at the rear of the rack. At the boundary region 29 between adjacent chassis, additional modules provide interconnection between the chassis in any desired combination. For example, a connection may be made from a contact spring on chassis 1E to a contact spring on either chassis 1D above it, to chassis 1F below it or to a spring on any one of the chassis 1A, 1B and 1C or to any combination of them. This flexibility and the means by which it is achieved will be more fully described in what is to follow.

Figure 2:
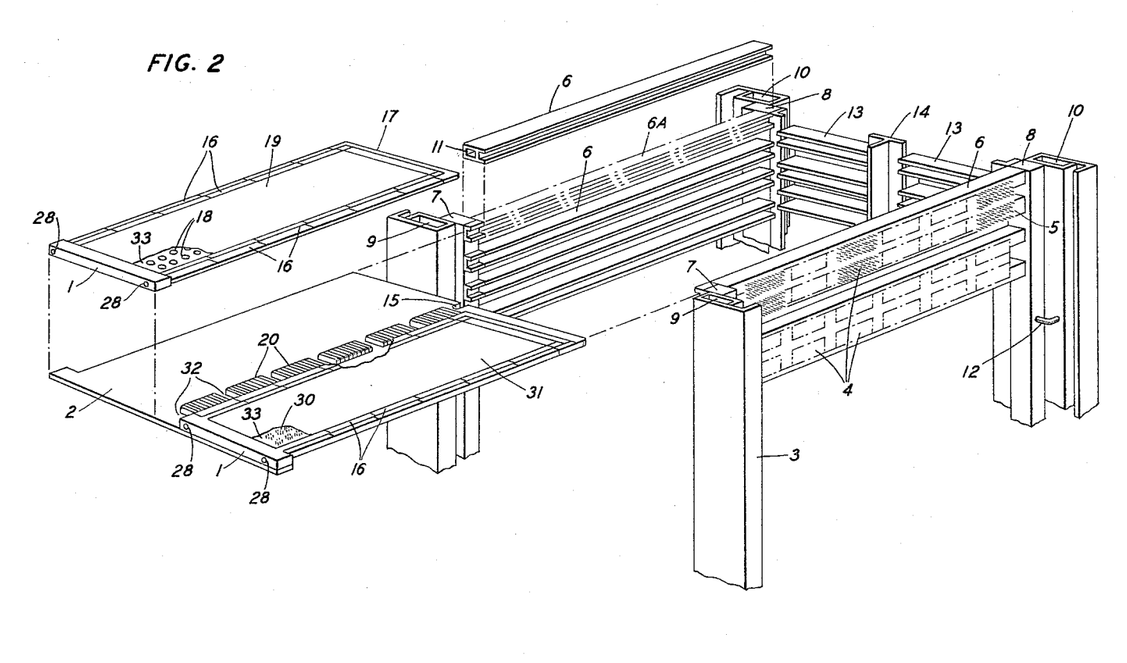
FIG. 2 is an exploded perspective showing of some of the principal features of the improved circuit package of this invention.
Figure 5:
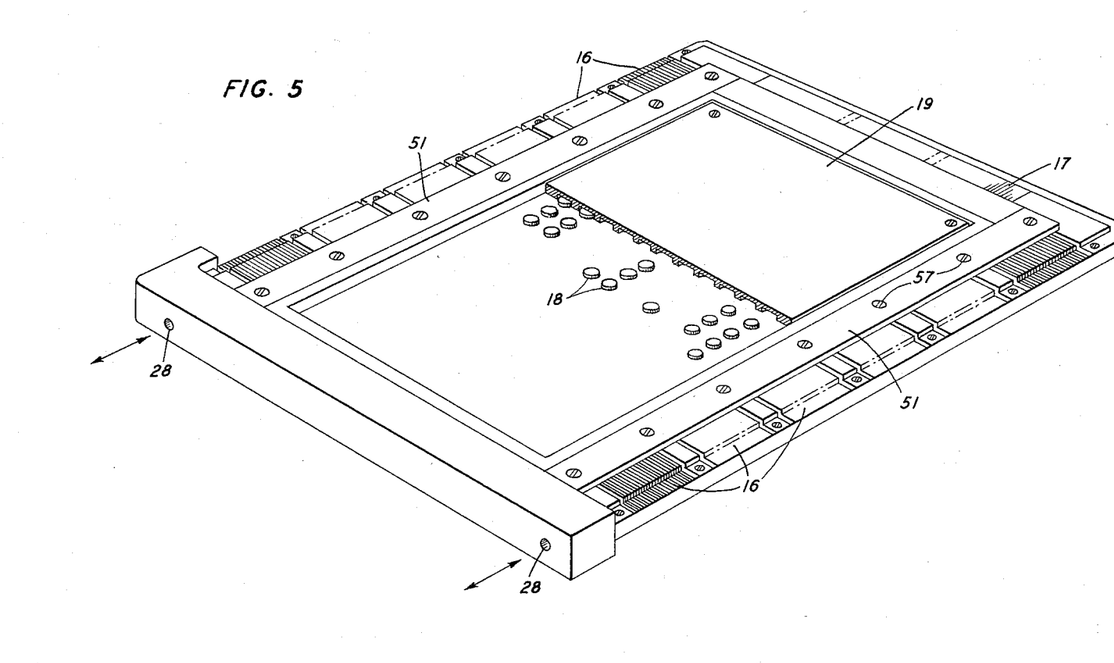
FIG. 5 is a perspective showing of a typical circuit chassis.

In the exploded perspective view of the circuit package shown in FIG. 2, a chassis carrier 2 is withdrawn from a pair of oppositely disposed carrier plate slides 6 and one of the chassis 1 has been lifted to expose the connector blocks 20 mounted in apertures 32 in the carrier plate. The general arrangement of the integrated circuit packages 18 within the circuit chassis is similar to that disclosed in the previously filed and copending application of W. T. Drugan, J. S. Hagen, Jr., G. J. Smith and J. G. Trautman, Serial No. 362,202, filed April 23, 1964. Both of these copending applications are assigned to the same assignee. In the earlier filed application, interconnection between adjacent chassis was effected by a cam mechanism located in the chassis carrier. As the cam mechanism was rotated to one position, interconnections were completed between adjacent chassis. In a second position of the cam mechanism, the connections were broken to provide clearance for withdrawal of the circuit chassis. In the present invention, the module groups 20 supported by the carrier plate 2 contain no moving parts whatever. Instead, six groups of springs 16 along the sides of the chassis, better shown in FIG. 5, are simultaneously actuated by a mechanism inside the chassis which is operated by a screwdriver or wrench inserted in openings 28 on the front surface of the chassis. When this mechanism, to be more fully described later, is actuated, the springs in the chassis are caused to deflect and engage contact pads on the connector blocks 20. When this mechanism is released, the springs all retract within the boundary surface of the chassis so that the chassis may be withdrawn without mechanical interference with the connector blocks 20 or other portions of the supporting structure. A similar action takes place between the contact springs and the lateral terminal field groups 4.

Each chassis may contain eleven rows of integrated circuit packages 18, each row containing twenty-seven packages. Therefore, in the typical case illustrated in FIG. 2, each chassis contains two hundred and ninety-seven integrated circuit packages. These are interconnected as required either through a multilayer printed circuit board to which they are attached or by wire-wrapped conductors or by both methods of connection. Connections are also made to the contact spring groups 16 along the sides as well as to the rear terminals 17 at the rear end of the chassis. A suitable heat sink and retaining plate 19 covers these circuit packages.

It will be noted in FIG. 2 that some of the pins of the circuit packages 18 are shown exposed at 30. The physical arrangement of the parts on the two chassis shown in this figure is identical although the interconnections in their multilayer printed circuits as well as their connections to their access terminal springs may differ. In inserting these chassis in their compartments, the chassis on the left is inserted with the circuit package headers on top while the chassis on the right is turned over so that the headers are down and the circuit package pins 30 are on top. A suitable insulating cover 31 covers these circuit package pins after they have been interconnected either through the multilayer printed circuit board or by way of wire wrap connections as more fully illustrated in FIG. 6. It may be mentioned at this point that instead of permitting the circuit package pins to protrude through and beyond the surface of the printed circuit board they may be terminated substantially flush therewith and connected by solder to printed circuit lands in accordance with conventional practice. In this latter event, a second array of circuit packages in a second multilayer printed circuit board may be included within the same chassis, thereby doubling the number of circuits possible within a given chassis. This modification is not specifically illustrated in the accompanying drawings.

FIG. 2 also shows the rack which comprises the corner structures 3 connected by a plurality of carrier plate slides 6 on either side and rear terminal module supports 13 at the back. The carrier plate slides 6 contain coolant ducts 11 extending throughout their lengths. These ducts connect at the front to a header 7 and at the rear to a header 8. Header 7 at the front in turn is connected with a coolant supply canal 9 while header 8 at the rear connects with a coolant return canal 10. The arrangement for the passage of the coolant is not shown in detail, but embodies only conventional structure. The supply coolant from canal 9 enters the duct 11 in the upper carrier slide through its header 7. At the rear end of this slide the coolant leaves duct 11 and enters header 8 in which a passage is provided to convey the coolant to the next lower carrier slide 6 which it traverses and again enters header 7 which contains a passageway to the next lower carrier slide. After traversing an odd number of slides, preferably about 5, it emerges from the rear header 8 through a coolant return tube 12 to the coolant return canal 10. From this description it is evident that coolant is supplied from the coolant supply canal 9, traverses the coolant ducts in an odd number of carrier slides and returns to the return coolant canal 10. Heat generated in the circuit packages is conveyed from the chassis to carrier plate 2 which is of good thermal conductivity, preferably aluminum, from which it is conveyed to the cooled carrier plate slides 6.

When a carrier plate is inserted in its slides, a centering guide 14 at the rear of the rack enters a centering notch 15 at the rear of the plate, thereby precisely determining the lateral position of the carrier plate. Means for securing the plate in position has been deleted for clarity but may comprise any well known conventional means such as a screw or latch on the front end.

Figure 3:
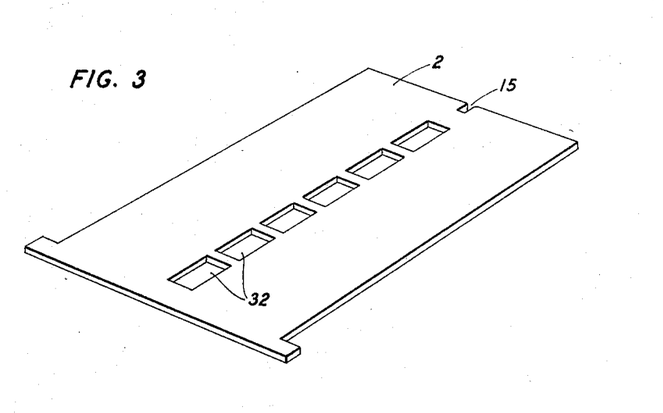
FIG. 3 shows a chassis carrier plate with the connector blocks removed.

FIG. 3 is a perspective of the chassis carrier plate 2. Centrally located along the length of the plate is a row of apertures 32 in which are supported the connector blocks 20 previously mentioned. The centering notch 15 is shown at the rear end of the plate.

Figure 4:
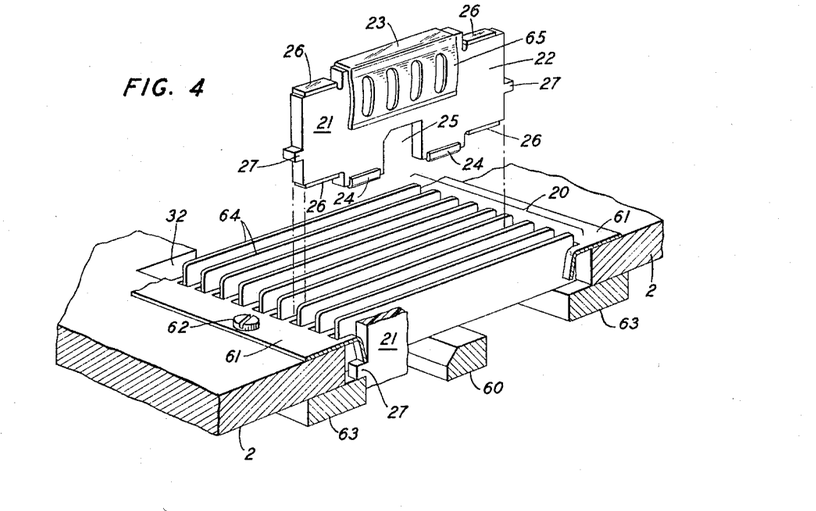
FIG. 4 is a fragmentary view of a connector block with one of the program modules withdrawn.

A fragmentary view of a connector block 20 is shown in FIG. 4. Such a block corresponds with the six blocks shown centrally located in the apertures 32 in the carrier plate 2 in FIGS. 2 and 3. This connector block may contain twenty connector block receptacles for the modules. The receptacles are formed by a plurality of metal separators 64 which are integral with the program module index bar 60 and the module support plates 63 shown on either side of the aperture 32 in carrier plate 2. One of the modules 21 is shown withdrawn from the receptacle and comprises a module body 22 molded of insulating material and having extending from opposite ends thereof a pair of lugs 27 which are used for securing the module in place. Four signal contact pads 26 are located near the corners along the top and bottom surfaces and these four pads may be interconnected in any arbitrary combination by circuit paths molded within the module body 22. In addition to the circuit pads 26, a ground pad 23 and a pair of ground pads 24 are formed from a single metal sheet and positioned around the top and bottom surfaces as shown in the figure. Portion 65, extending downwardly from the upper ground pad 23, is curved outwardly to act as a contact spring to form a secure ground connection between the metal separators 64 as the module is inserted in its receptacle.

It will be noted that a rectangular index notch 25 has one upper corner different from the other so as to mate with a complementary shape on the program module bar 60. By this means the program module may be inserted in the receptacle in only one way. The two module hold-down brackets 61 engage the upper surfaces of the lugs 27 while the lower surfaces of these lugs rest firmly on the module support plates 63. This is illustrated by the fragmentary portion of a program module in the lower left portion of the figure. The hold-down brackets 61 are secured by screws, illustrated by screw 62, extending through the chassis carrier plate 2 and engaging threads in the support plate 63.

Because the four signal circuit pads 26 may be internally interconnected in any arbitrary combination, any one pad may be connected to any one or more other pads to provide a great variety of adjacent interchassis circuit paths. In this way, any possible combination of interchassis connections are provided by simply inserting a module 21 having the desired interconnection combination. All possible combinations between the four signal circuit pads are provided by only fourteen different modules. Additional modules may provide ground connections to any combination of signal circuit pads if this is desired.

Figure 8:
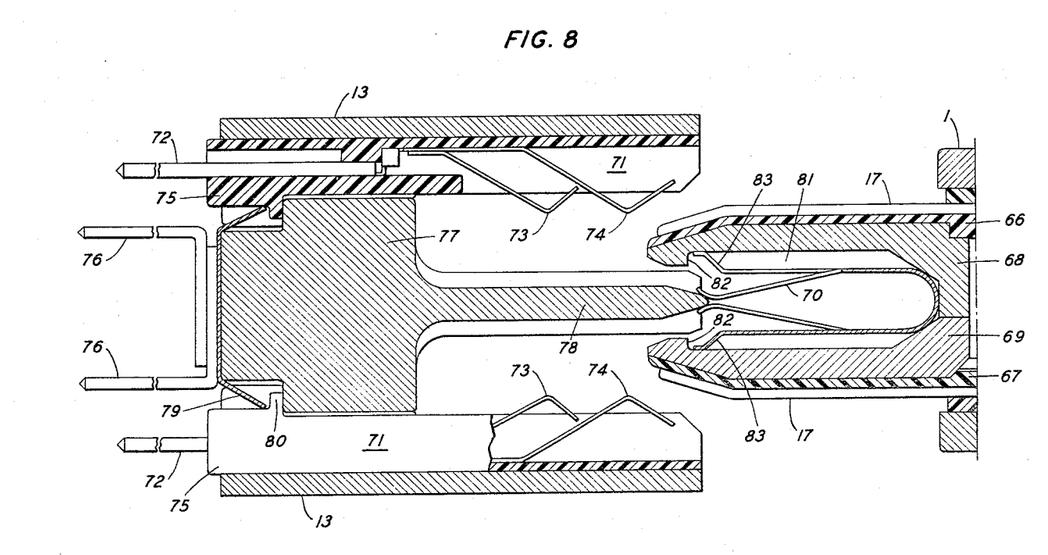
FIG. 8 is a section view showing how connections are made between the springs and the rear terminal field modules.

FIG. 5 is a perspective illustration of one of the circuit chassis. Six groups of chassis contact springs 16 are shown along each side corresponding with the six terminal field groups 4 and the six groups of connector blocks 20 illustrated in FIG. 2. The contact terminals 17 at the rear of the chassis are stationary and engage contact springs at the rear of the rack supported by the rear terminal module supports 13 of FIG. 2. The details of these rear connectors are illustrated in FIG. 8 and will be described more fully later. Only a few of the integrated circuit packages 18 are actually shown in this figure but, as indicated above, a typical arrangement might consist of eleven rows each containing twenty-seven packages. The invention of course is not restricted to this particular number of packages. These packages are preferably held in place by a retaining cover plate 19 which also serves as a heat sink and is therefore constructed of material having good thermal conductivity.

Figure 6:
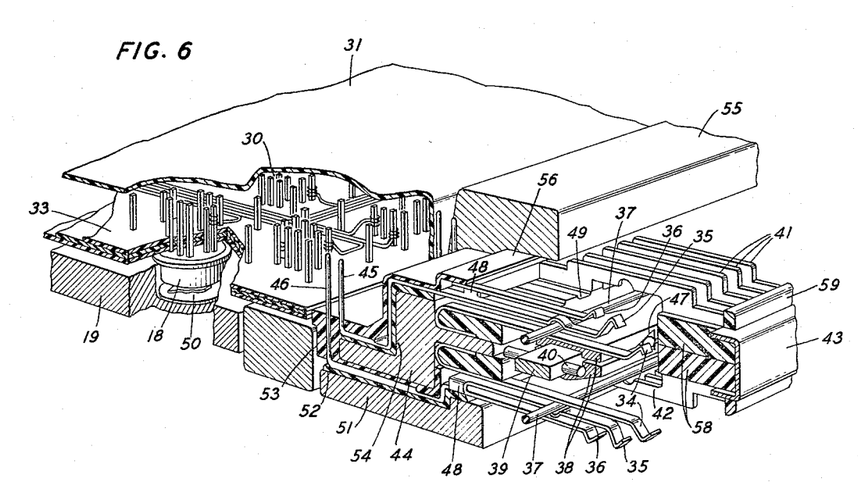
FIG. 6 is a section perspective of a portion of the access frame along one of the sides of a chassis.

A section perspective of a portion of the access frame along one of the sides of the chassis is shown in FIG. 6. This figure shows two sets of contact springs, one set for one circuit at the upper side of the chassis and one set for another circuit at the lower side. These springs are only part of a group of twenty upper and twenty lower sets comprising one of the groups 16 previously mentioned. Contact springs 34 are the ground springs and are connected directly to the ground bus 44. Springs 35 and 36 are electrically connected together by reason of having been formed from a single strip of contact spring material and are joined together by a bridge 48. These springs are called the signal springs and may be connected to integrated circuit package terminals inside the chassis by way of wire wrap connections. The two contact springs insure a good, low resistance signal circuit path. The upper signal springs terminate in a terminal 45 and the lower signal springs terminate in terminal 46 and it is to these two terminals 45 and 46 that the wire wrap connections may be made. The actual connections are not shown in FIG. 6 between these particular terminals and the integrated circuit package terminals but the connections may be made in the same manner as illustrated between other terminals in this figure.

A pair of spring actuator bars 38 extend between and perpendicular to the ground contact springs 34 and when these two actuator bars are separated they cause the ground springs to deflect away from each other so that all six springs make contact with their contact pads on the stationary terminals on either side of the chassis. As the ground springs deflect, they force the signal springs 35 and 36 to also deflect by reason of a transverse insulating rod 37 positioned between the ground springs and signal spring 35. A bent portion on spring 35 opposite insulating rod 37 bears against spring 36 and causes it to deflect. An actuator draw bar 39 is located between the two spring actuator bars 38 and contains a plurality of cam pins 40 extending laterally from the draw bar and located inside some cam ramps 47 in the actuator bars. It will be evident that, as the draw bar 39 is forced toward the left, the cam pins 40 will be caused to move toward the narrower section of the cam ramps 47 thereby driving the two actuator bars apart. The actual mechanism for forcing the draw bar 39 forward is not shown but it may comprise any conventional mechanism as for example a worm and rack, the rack being attached to the draw bar and the worm being driven by a screwdriver or hexagon wrench from the front through the openings 28 illustrated in FIG. 5. Alternatively, a conventional internal thread may be included in the end of draw bar 39 which is engaged by a standard bolt, the head of which is recessed in a counter bore and accessible through openings 28. Such mechanisms are so well known in the art that they need not be shown in detail in order to obtain a full understanding of this invention.

Each set of ground and signal springs are located between a pair of separators 41. These separators are made of insulating material and are held together by a metal C-channel 43 which acts as a separator retainer as well as a chassis guide during insertion and removal of the chassis from their compartments. Alternatively, these separators may be made of metal coated by suitable insulation. When made of metal some additional crosstalk improvement can be realized. The ground springs 34 are kept in alignment by reason of some grooves 49 in the insulating block around which the inner ends of the springs are wrapped. The signal springs are insulated from the ground springs by reason of the insulating rod 37 and are kept insulated from adjacent springs by the insulating separators 41. Insulating material 52 insulates the lower signal springs 35 and 36 from the contact spring retaining plate 51. Additional insulation 53 and 54 insulates both signal springs from the ground bus 44 and insulating material 56 insulates the upper signal springs 35 and 36 from the upper clamp 55. FIG. 5 discloses the contact springs arranged in six groups as shown at 16 and it is between these groups and at the extreme ends that screws 57, also shown in FIG. 5, are passed and threaded into ground bus 44 in order to secure the spring assembly between retaining plate 51 and the ground bus. Similar screws, not shown, secure clamp 55 to ground bus 44. The use of screws for clamping contact springs and similar structures together is so well known that a specific showing thereof in these drawings is altogether unnecessary to a complete understanding of this invention. Their inclusion would only tend to obscure more essential features. FIG. 6 also illustrates the position of the circuit package retainer spring 50 located in each of the recesses in the retaining plate and heat sink 19. The remaining reference numerals in FIG. 6 correspond with those shown in the other figures and relate to parts which have already been described. This construction of the signal springs permits ready replacement if damaged or worn.

Figure 7:
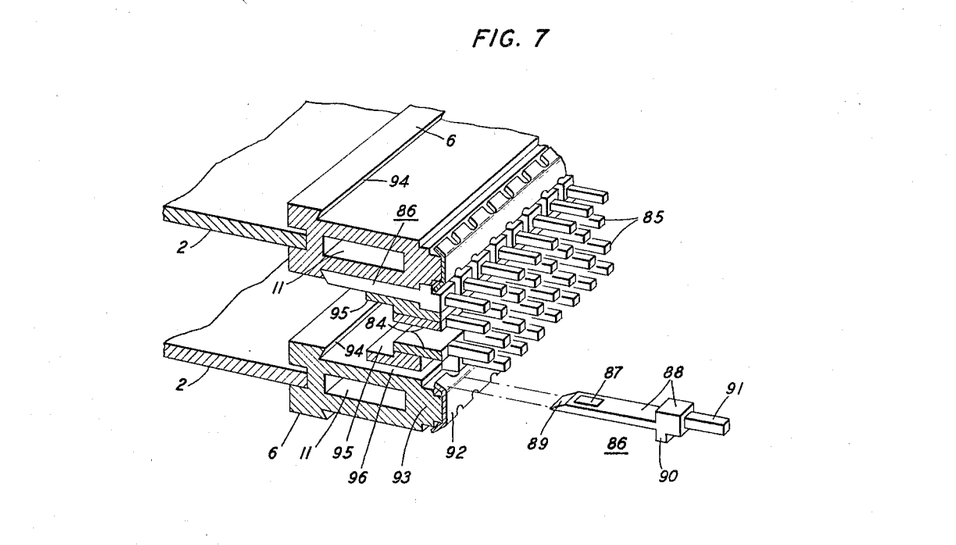
FIG. 7 is a fragmentary view of the side terminal field showing a side terminal field module withdrawn.

FIG. 7 is a fragmentary showing of the side terminal field with one of its modules withdrawn. The carrier plate slides 6 are constructed with a retaining notch 94 for retaining the inner ends of the side terminal modules 86. Only portions of two carrier plate slides 6 are shown with some side terminal field modules in place between the carrier plate slides and a module support plate 95. The side terminal field ground buses 84 are secured to the module support plate 95 but may, if desired, be made integral therewith as these are both of conductive material. The ground buses 84 have extending therefrom a plurality of ground terminals 85 to which wire wrap connections may be made. One of the terminal field modules 86 is shown withdrawn from the field and, as illustrated, consists of an insulating case 88 molded around the signal terminal 91 which is connected by a conductive path within the insulating case 88 to a signal circuit pad 87 to which the signal springs 35 and 36, shown in FIG. 6, connect. The ground spring 34 of the chassis connects to the ground bus 84. Module 86 has a tapered end portion 89 which is complementary to the retaining notch 94 so that when inserted it is accurately positioned in place. The modules are prevented from being unintentionally withdrawn by reason of a retainer lug 90 integral with the insulating case 88 which is engaged by a module retainer 92. Retainer 92 is secured to a projection 93 on the carrier plate slide 6 by means of screws not shown. The remaining reference numerals in this figure refer to parts previously described in other figures.

FIG. 8 is a section view showing how the connections are made between the rear terminal field modules and the terminals at the rear of the chassis. Only a section through the rear chassis terminals is shown, the rest of chassis 1 being omitted. The upper and lower signal pads 17 are secured to the rear of the chassis and insulated from a two-part ground bus 68, 69 by insulation 66 and 67, respectively. The two-part ground bus 68, 69, when assembled, forms a cavity 81 for receiving a ground spring 70. This ground spring 70 may extend along the length of the spring group and have a plurality of spring leaves which will engage the ground bus prong 78 as the chassis is inserted in its compartment. This spring also includes a pair of latch springs 83 which engage latches 82 to retain the spring once it is inserted in the cavity 81. Latch springs 83 also maintain secure electrical contact with the inner surfaces of ground bus parts 68 and 69.

In addition to the ground connection made between the ground springs 70 and the ground bus prong 78, signal circuit connections are also effected between the rear chassis signal terminal pads 17 and the signal springs 73 and 74 which are arranged as a redundant pair to insure good electrical connection. Signal contact springs 73 and 74 emerge to the rear terminal field in a rear field signal terminal 72. The rear signal field springs are contained within an insulating case 75 to form a removable module 71 to facilitate maintenance. A retaining lug 80 is molded integral with the insulating case 75 and serves to prevent the modules from being driven out of their receptacles formed by the rear module support 13 and ground bus 77 as the chassis is inserted. These rear signal spring modules are retained by a metallic rear field module retainer 79 to which is electrically secured the rear field ground terminals 76, the retainer 79 being secured to the ground bus 77 by a series of screws, not shown.

Figure 9:
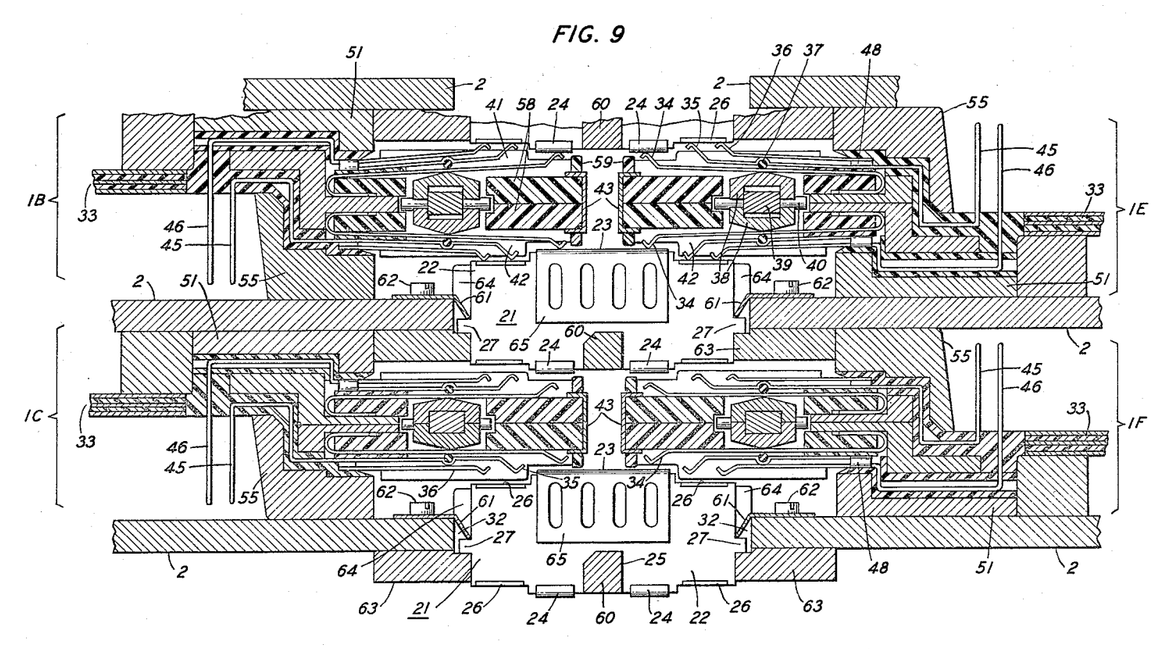
FIG. 9 is a section view through a connector block assembly showing the physical relationship between the connector blocks and the cam bars with the cam actuator bars in the two upper chassis shown in their operated positions and the bars in the lower chassis shown in their released positions.

FIG. 9 shows a section through the connector block assembly illustrating the physical relationship between these blocks and the connector springs on the chassis. This is only a fragmentary view to more clearly disclose a typical arrangement of the parts in the region of the connector blocks located along the center of the chassis carrier plates 2. The adjacent sides of two chassis are shown at the top and the corresponding sides of two other chassis are shown below. The two upper chassis show their springs in their operated positions making contact with the contact pads on the program modules. The two lower chassis assemblies are shown with their springs disconnected and in the position for withdrawing the chassis from their compartments. For example, the upper right spring assembly is shown with its upper ground spring 34 in contact with a module ground pad 24 while the associated two signal contact springs 35 and 36 are in contact with a signal circuit contact pad 26. Similar connections are made between the companion springs of the same chassis and the ground and signal contact pads on the module directly below this spring assembly where the lower ground spring 34 is in contact with the upper ground contact pad 23. As previously described, the springs are caused to assume their connected positions by reason of draw bar 39 being drawn forward so that the cam pins 40 force the spring actuator bars 38 apart, thereby driving all six springs to their connected positions, the signal springs being driven to their connected positions by reason of the force exerted through the insulating rods 37 located between the ground spring and signal spring 35.

It is to be understood that in each group of spring assemblies the separators 41 are integral with an insulating web 58 joined into a single unit and that a similar web is integral with the lower group of separators 42. The outer ends of webs 58 carry flanges 59 extending at right angles therewith, these flanges being also integral with their associated separators. Slots extending lengthwise of these flanges receive the C-channel retainer 43 which, in assembly, holds the outer edges of the upper and lower separator assemblies together. These retainers are secured by means of screws, not shown, extending vertically through their legs and the insulating webs 58. The inner ends of these separators are merely clamped in the assembly between the retaining plate 51 and the clamp 55 which are, as previously described, secured with screws to the ground bus 44.

FIG. 9 also shows the index notch 25 in the module 21, one corner of which has been formed at an angle to preclude incorrect insertion of the module between the separators 64 as shown more clearly in FIG. 4. These modules are inserted in the carrier plates from the top so that retaining lugs 27 at opposite ends of the module rest upon the module support plate 63. The module is then secured in place by means of a hold-down bracket 61 and bracket screws 62 which extend through the carrier plate 2 and are threaded in the support plate 63.

FIG. 9 also discloses the lower two chassis spring assemblies in their retracted or disconnected positions so that their contact springs rest below the outer surfaces defined by the separators 41 and 42. As the chassis springs are protected by the separators and flanges 59 and have clearance around their entire access frames from all other parts in the assembly, they may be readily withdrawn from their compartments. The remaining reference numerals in FIG. 9 correspond with parts previously described.

While this invention has been illustrated by a circuit package having only one chassis in depth and two in width, it is evident that the carrier plates 2 may be made wider and contain additional rows of apertures 32 to accommodate additional chassis in width. A second rack may be made integral with rack 3 and extend to the rear thereof to form a double rack capable of accommodating another array of chassis entering from the rear of the package, thereby also doubling the number of chassis in depth. A single carrier plate extending the full depth of the double rack may contain additional modules of the same type as module 21 to interconnect the rear terminals of the adjacent chassis. However, in this case it is preferable that these modules have contact springs of the type shown in FIG. 8 instead of the stationary pads 26. These and other modifications are clearly obvious from the specific disclosure selected for illustrating the invention and are within the scope of the present invention.

From the foregoing description it will be seen that the objects of this invention are quite satisfactorily achieved. By the simple operation of actuating the draw bars 39 within each side of a single chassis, that chassis may be readily withdrawn for circuit modification or repair. Since these actuators are within the chassis to be removed, no other chassis are in any way disturbed nor is any other mechanism required to be operated. Moreover, interconnections between the chassis within the rack are very quickly and conveniently changed by merely removing the chassis surrounding a carrier plate, sliding the carrier plate out and changing one or more of the program modules 21. The invention also achieves the very important object of preventing crosstalk by reducing electrical discontinuities through the interconnecting structure. This is accomplished by using flat springs and carrying the signal and ground springs at a uniform distance apart throughout substantially their entire lengths, thus approximating a strip line configuration. This is further facilitated by employing the well known principle of carrying, as far as possible, suitable dielectric insulating material of proper thickness between the signal springs, including their leads, and the ground plane defined by the ground bus and the ground spring. Electrical tests on this construction have demonstrated negligible reflection and crosstalk in the transmission of digital data.

What is claimed is:

1. An electronic circuit package comprising a rack having a plurality of compartments with parallel side walls, a plurality of circuit chassis containing electric circuits and having parallel sides for slidable insertion in said compartments, a plurality of deflectable contact springs supported along at least one of the parallel sides of each chassis, said springs being connected to said electric circuits, a plurality of stationary contact terminals supported by said compartment walls so that each terminal is opposite one of said springs when its chassis is in a compartment, a mechanical means in said chassis for deflecting its contact springs to either of two positions, one position connecting said springs to the contact terminals and the other position disconnecting said springs to permit withdrawal of the chassis from its compartment.

2. The combination of claim 1 wherein the contact springs for each of said electric circuits comprise a flat grounding spring positioned equidistant from a flat signal spring throughout substantially their common length.

3. The combination of claim 1 wherein some of said stationary contact terminals supported by said compartment walls are supported by said walls through a carrier plate secured to said walls, said stationary terminals supported by the plate included in removable modules each having additional stationary contact terminals positioned opposite the contact springs on adjacent chassis in said rack, each of said modules including arbitrary conducting paths between its several contact terminals.

4. The combination of claim 2 wherein some of said stationary contact terminals supported by said compartment walls are supported by said walls through a carrier plate secured to said walls, a grounded terminal for each grounding spring and a signal terminal for each signal spring, said terminals supported by the plate being included in removable modules each having additional stationary contact terminals positioned opposite the contact springs on adjacent chassis in said rack, each of said modules including arbitrary conducting paths between its several contact terminals.

References Cited by the Applicant

UNITED STATES PATENTS

| | | |
|---|---|---|
| 1,750,246 | 3/1930 | Serrell. |
| 2,864,977 | 12/1958 | Witt et al. |
| 2,880,379 | 3/1959 | Stoddart et al. |
| 2,885,603 | 5/1959 | Rose. |
| 2,889,493 | 6/1959 | Scal et al. |
| 2,907,926 | 10/1959 | Slack. |
| 2,955,236 | 10/1960 | Luhn. |

ROBERT K. SCHAEFER, *Primary Examiner.*

W. C. GARVERT, *Assistant Examiner.*